United States Patent Office 3,431,829
Patented Mar. 11, 1969

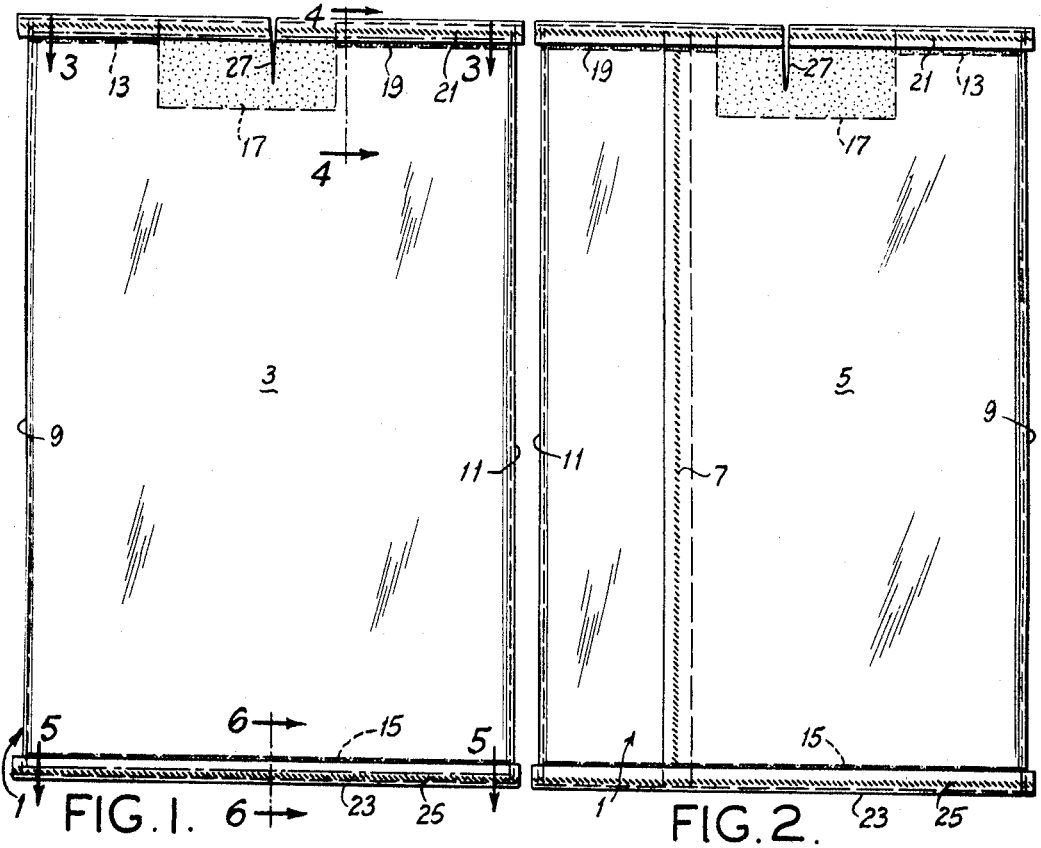
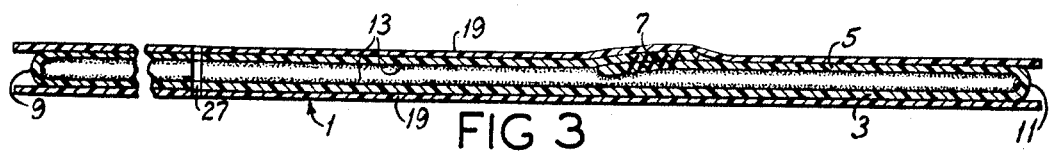
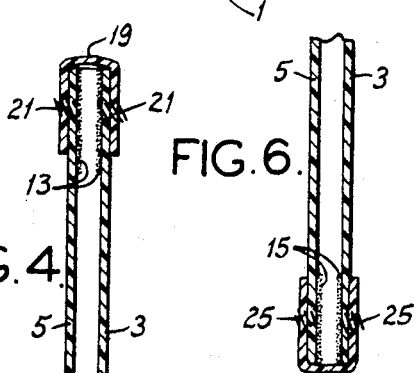

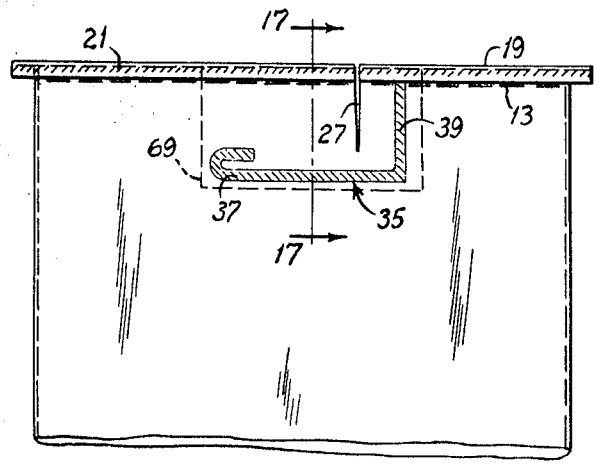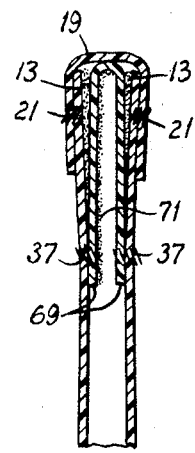
FIG. 16.  FIG. 17.
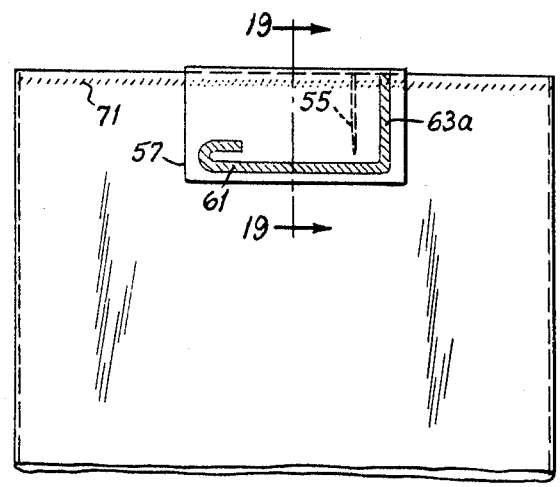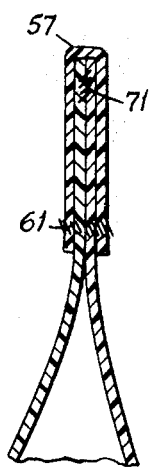
FIG. 18.  FIG. 19.

3,431,829
METHODS OF MAKING BAGS
Ralph C. Goodwin, Wayzata, Minn., assignor to Bemis Company, Inc., Minneapolis, Minn., a corporation of Missouri
Original application Sept. 22, 1964, Ser. No. 398,315, now Patent No. 3,262,634, dated July 26, 1966. Divided and this application Apr. 1, 1966, Ser. No. 539,441
U.S. Cl. 93—35           10 Claims
Int. Cl. B31b 49/04

ABSTRACT OF THE DISCLOSURE

Methods of making plastic valve bags of a type in which the valve is constituted by a slit extending inward from an edge of the bag and a plastic closure strap for the slit, so arranged that a filling spout may be inserted through the slit, the strap serving to close the slit after the bag has been filled and the spout withdrawn, involving heatsealing of the strap to the bag walls after cutting of the slit, without sealing together the bag walls.

---

This application is a division of our copending U.S. patent application Ser. No. 398,315, filed Sept. 22, 1964, entitled Bag, issued as U.S. Patent 3,262,634, July 26, 1966.

Among the several objects of the invention may be noted the provision of improved methods of making valve bags, and particularly heavy-duty valve bags, of heat-sealable sheet plastic material such as polyethylene, in which the valve may be formed after completion of the bag proper, and in which seals are made in the region of the valve without sealing together the walls of the bag; the provision of such method in which the valve may be formed in the course of manufacture of the bags. Other objects and features will be in part apparent and in part pointed out hereinafter.

The invention accordingly comprises the methods hereinafter described, the scope of the invention being indicated in the following claims.

In the accompanying drawings, in which several of various possible embodiments of the invention are illustrated, FIG. 1 is a view in elevation of one face of a partially completed first species of valve bag made in accordance with this invention;

FIG. 2 is a view in elevation of the back of the FIG. 1 partially completed bag;

FIG. 3 is an enlarged transverse section taken on line 3—3 of FIG. 1;

FIG. 4 is an enlarged partial longitudinal section taken on line 4—4 of FIG. 1;

FIG. 5 is an enlarged transverse section taken on line 5—5 of FIG. 1;

FIG. 6 is an enlarged partial longitudinal section taken on line 6—6 of FIG. 1;

FIG. 16 is a fragmentary elevation showing a fourth species constituting a variant of the first species;

FIG. 17 is an enlarged section taken on line 17—17 of FIG. 16;

FIG. 18 is a fragmentary elevation showing a fifth species; and

FIG. 19 is an enlarged section taken on line 19—19 of FIG. 18.

Figure 7:
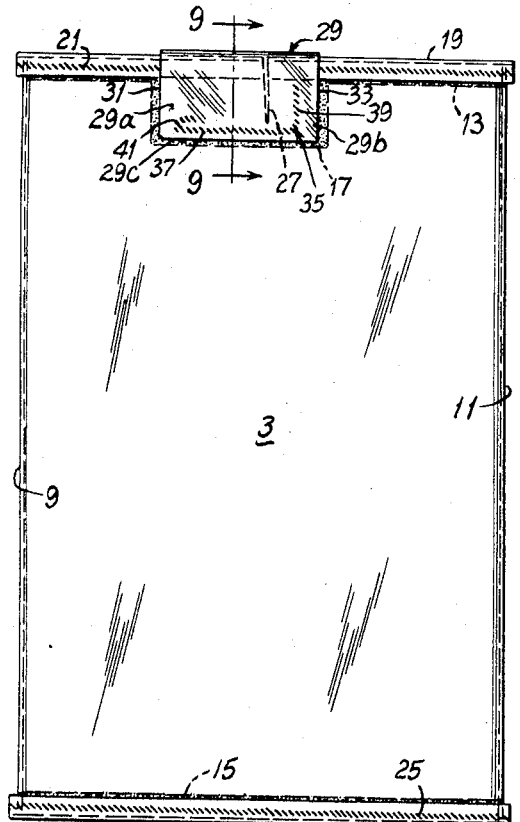
FIGS. 7 and 8 are front and back elevations of a completed first species of valve bag made in accordance with this invention.

Thicknesses are exaggerated in FIGS. 3–6, 9, 10, 13, 15, 17 and 19.

Corresponding reference characters indicate corresponding parts throughout the several views of the drawings.

Referring first to FIGS. 1–6 of the drawings, there is indicated at 1 a flat bag tube made from heat-sealable sheet plastic material, in particular polyethylene. This may be made, for example, by forming a continuous web of polyethylene into a flat bag tubing with a back seam and segmenting the tubing into individual flat bag tubes 1 in conventional manner. One wall of the tube, which may be referred to as its front wall, is designated 3. Its other wall, which may be referred to as its back wall, is designated 5. The back seam of the tube, which is in its back wall 5, appears at 7 in FIGS. 2, 3 and 5. The side edges of the tube are constituted by folds 9 and 11 in the sheet polyethylene. While a seamed tube is shown, it is contemplated that a seamless tube may be used.

Figure 9:
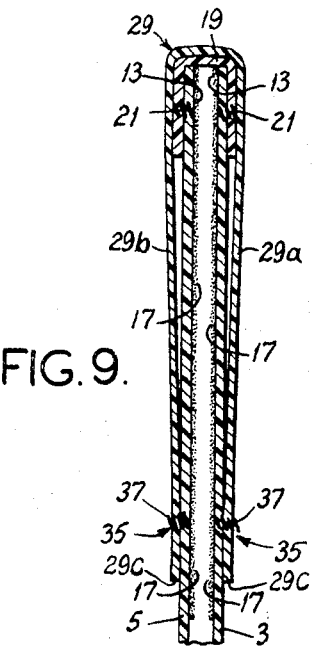
FIG. 9 is a partial longitudinal section taken on line 9—9 of FIG. 7.
Figure 10:
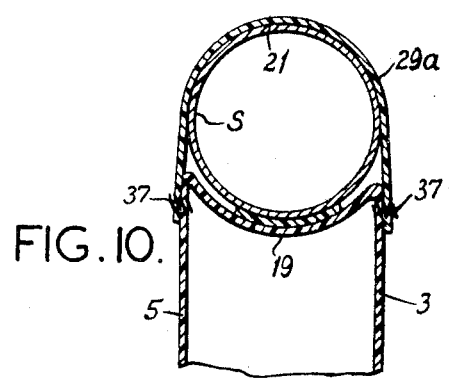
FIG. 10 is a view similar to FIG. 9 showing how a filling spout is inserted.

In accordance with this invention, the tube 1 is specially prepared with a stripe 13 of heat-seal-inhibiting material extending substantially all around the inside thereof at one end which is to constitute its valve end (its upper end as shown), and with a stripe 15 of heat-seal-inhibiting material extending substantially all around the inside theerof at its other end (its lower end as shown). While these stripes are shown as extending substantially all around the inside of the tube, it will be understood they may extend only across one wall (the front wall 3, for example). Stripe 13, which is at the upper end of the tube as shown, has registering widened areas 17 located on the inside of walls 3 and 5 somewhat nearer one side of the tube (its left side as illustrated in FIG. 1) than its other side. See FIG. 9 showing these areas 17 on both walls. It will be understood that an area of heat-seal-inhibiting material on one wall may be sufficient.

The heat-seal-inhibiting material used at 13, 15 and 17 may be, for example, a commercially available polyamide-based ink which is unpigmented so as not to appear through the polyethylene. As noted above, tubes 1 may be made from a continuous web of polyethylene, and this web may be printed with said heat-seal-inhibiting ink in a suitable pattern to provide stripes 13 and 15 (including widened portion 17 of stripe 13) when the tubing into which the web is formed is segmented into bag tubes such as the tube 1.

As appears in FIGS. 1–4, the upper end of the tube 1 is closed by folding a tape 19 of heat-sealable sheet plastic material, in particular polyethylene, around the upper end of the tube and applying heat and pressure to the opposite sides of the tape along a line 21 within the confines of stripe 13, to cause one side of the tape to become heat-sealed to the outside of one wall of the tube and the other side of the tape to become heat-sealed to the outside of the other wall of the tube along the line of seal 21, without any heat-sealing together of the walls of the tube by reason of the inhibition of such sealing by stripe 13. The lower end of the tube is similarly closed by folding a tape 23 of similar heat-sealable sheet plastic material around the lower end of the tube and applying heat and pressure to opposite sides of tape 23 along a line 25 within the confines of stripe 15, to cause one side of tape 23 to become heat-sealed to the outside of one wall of the tube and the other side of the tape to become heat-sealed to the outside of the other wall of the tube along the line of seal 25, also without any heat-sealing together of the walls of the tube by reason of the inhiibtion of such sealing by the stripe 15.

The above operations result in a bag which is closed all around its edges—by folds 9 and 11 at the sides and by tapes 19 and 23 at its ends. In accordance with this invention, a slit 27 is cut in the tape 19 and in both walls of the tube extending inward from the upper end of the bag within the widened area 17 having heat-seal-inhibiting material thereon. This slit is cut adjacent the center of the upper end of the bag, preferably nearer the left side of the bag than its right side as viewed in FIGS. 1 and 7, and lies nearer the right side of area 17, than its left side as viewed in FIGS. 1 and 7.

Figure 8:
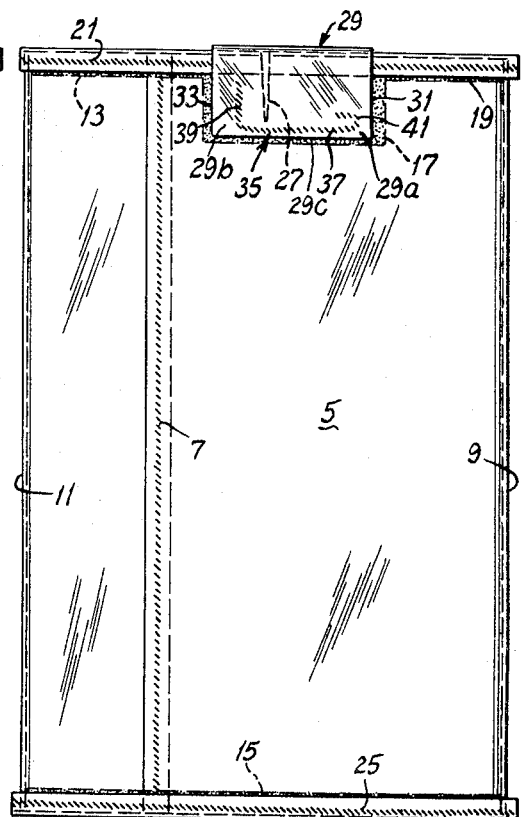

Following the cutting of the slit 27, a piece of heat-sealable sheet plastic material (e.g., polyethylene) is folded around the tape 19 to overlie the slit (see FIGS. 7–9). This piece of material, which is generally designated 29, constitutes a closure for the slit, and may be referred to as a strap. Its dimension transversely of the bag (which is its endwise dimension in its folded condition) is considerably less than the width of the bag, and it is located on the upper end of the bag generally in register with area 17, thereby having a relatively long portion 29a on one side of the slit (the left side of the slit as viewed in FIG. 7) toward the end 31 of the strap and a relatively short portion 29b toward the other end 33 of the strap.

The opposite sides 29a and 29b of the strap 29 are heat-sealed to the outside of walls 3 and 5 of the tube by applying heat and pressure thereto along a generally L-shaped line of seal 35 having a portion 37 located inward of the inner (lower) end of the slit 27 extending transversely with respect to the slit and generally parallel and adjacent the side edges 29c of the strap and a portion 39 which extends generally perpendicular to portion 37 alongside the slit between the slit and the end 33 of the strap. Portion 37 of this line of seal extends from the inner (lower) end of portion 39 across the strap below the inner (lower) end of the slit substantially to the end 31 of the strap, where it has a return loop 41 primarily for purposes of strengthening the seal. The line of seal 35 is made within the confines of the area 17 of heat-seal-inhibiting material, as a consequence of which side 29a of the strap is heat-sealed to the outside of wall 3 of the tube along line 35 and side 29b of the strap is heat-sealed to the outside of wall 5 of the tube along a corresponding line 35 without heat-sealing walls 3 and 5 together along line 35 (see FIG. 9).

It will be observed that the closure strap 29 for the slit 27 is, in effect, open at its end 31 and closed at its end 33 by the seals at 39 (except where it passes around the tape). The construction is such that a filling spout S may be entered through the slit via the end 31 of the strap between the top of the strap and the tape 19 (see FIG. 10). As the spout is moved inward relative to the bag, the slit 27 opens up to enable the end of the spout to pass through to the interior of the bag. It is contemplated that the portion of the top of the bag to the left of slit 27 as viewed in FIG. 7 could initially be intucked or gusseted for greater ease in insertion of the filling spout.

When the spout is withdrawn after the bag has been filled, the region of the bag proper surrounding the slit is pressed outward against the strap 29 by reason of pressure of air within the bag and the contents of the bag. This effectively closes off the slit to prevent leakage of the contents of the bag.

Positive elimination of a face-to-face seal between walls 3 and 5 by means of the heat-seal-inhibiting material at 13 and 15 insures preservation of the strength of the seals at 21 and 25. If there were a face-to-face seal between the walls 3 and 5 along the line of seals 21 and 25, it would be a weak seal, resisting rupture only by its resistance to peeling apart, and its peel resistance would inherently be low. In this regard, it will be understood that the resistance to rupture of a heat seal in peel is considerably less than its resistance to rupture in shear. The face-to-face seal would tend to peel apart under stresses incurred on rough handling of the bag, and this would tend to weaken the bag along the line of end seals 21 and 25. Consequently, the strength of the bag is preserved by positive inhibition of a face-to-face seal between the bag walls along the lines of the end seals. Moreover, without a face-to-face seal between the bag walls along these lines, the capacity of the bag is increased or, conversely, the bag may be shorter for a given capacity. This is because the tapes 19 and 23 initially form the end closures at the very ends of the bag tube, rather than face-to-face seals between the bag walls spaced from the ends of the bag tube.

Figure 11:
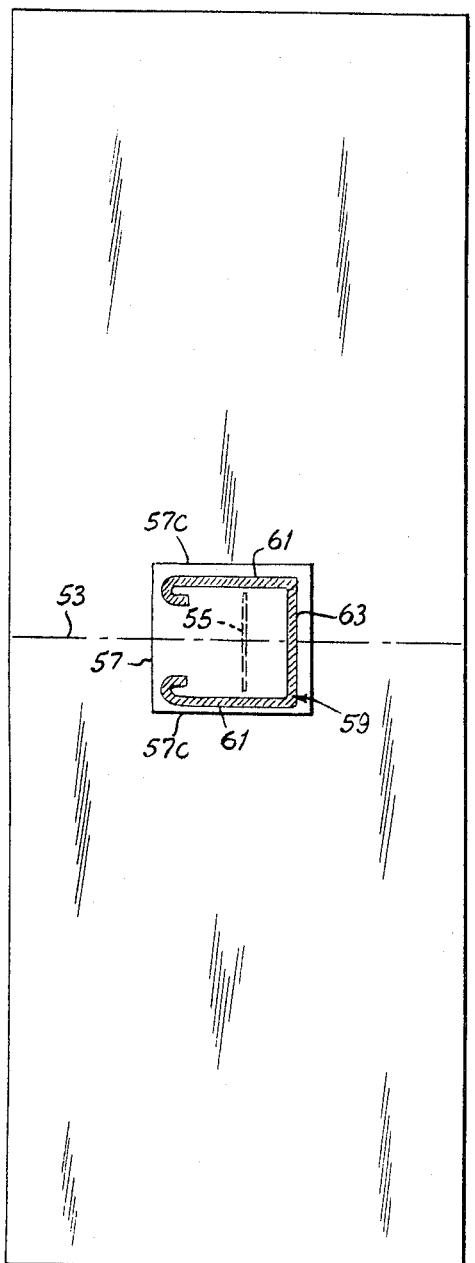
FIG. 11 is a view showing the manufacture of a second species of valve bag made in accordance with this invention.
Figure 12:
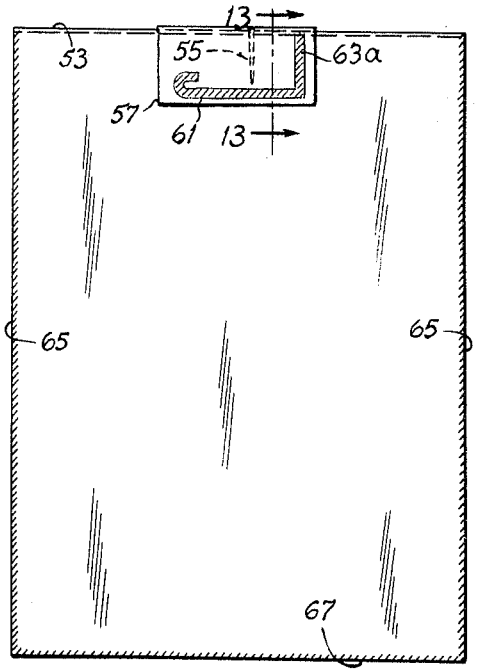
FIG. 12 is a view in elevation of one face of a completed second species of valve bag made in accordance with this invention.
Figures 13, 15:
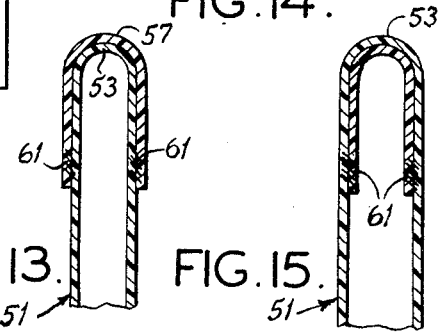
FIG. 13 is an enlarged section taken on line 13—13 of FIG. 12.
FIG. 15 is an enlarged section taken on line 15—15 of FIG. 14.

FIG. 11 shows a mode of manufacturing a second species of valve bag of this invention, in which the valve is formed in the course of manufacture of the bag, without using heat-seal-inhibiting material, and FIGS. 12 and 13 show the completed bag. Referring to FIG. 11, there is indicated at 51 a rectangular blank of heat-sealable sheet plastic material, in particular polyethylene, having a width corresponding to the desired bag width and a length corresponding to twice the desired bag height. This blank is ultimately to be folded in half on its transverse center line indicated at 53 in FIG. 11. It is provided with a slit 55 (which as will appear corresponds to slit 27) extending transversely across line 53. Slit 55, as shown in FIG. 11, is preferably located somewhat to the left of the center of length of lines 53, and the latter generally bisects the slit. A strap 57 of heat-sealable sheet plastic material, generally identical to that indicated at 29 in FIGS. 7–10, is applied over the slit, with its longitudinal center line generally registering with line 53, and heat-sealed to the blank along a generally C-shaped seal formation 59, providing lines of seal 61 (corresponding to lines 37) extending transversely with respect to the slit and generally parallel and adjacent the side edges 57c of the strap on opposite sides of line 53 (and generally parallel to line 53) outward of the ends of the slit, and a line of seal 63 interconnecting the right-hand ends of lines 61 (as shown in FIG. 11) extending across line 53.

After the strap 57 has been heat-sealed to the blank 51, the blank is folded in half on line 53. As a result of this folding, strap 57 is folded in half on its longitudinal center line. FIGS. 12 and 13 show the blank and strap in their folded condition and, as shown therein, the folding is such that strap 57 lies on the outside of the folded blank. The folded blank is heat-sealed along both sides as indicated at 65 and along the bottom as indicated at 67 to complete the formation of the blank into the bag shown in FIG. 12. This corresponds to the bag shown in FIGS. 7–9 in that it is closed all around its four edges, except that it is closed at the sides and bottom by heat seals 65 and 67, and at the top by an integral fold 53 in the bag material proper (instead of by a separate tape as in the bag shown in FIGS. 7–9). The slit 55 is in the folded top of the bag, instead of in a tape closure as in FIGS. 7–9. Otherwise, the FIG. 12 bag is similar to the bag shown in FIGS. 7–9, strap 57 straddling the top of the bag, overlying the slit, and functioning as a closure for the slit. Lines of seal 61 correspond to lines 37 and the two halves 63a of line of seal 63 in the folded strap 57 correspond to lines 39.

Figure 14:
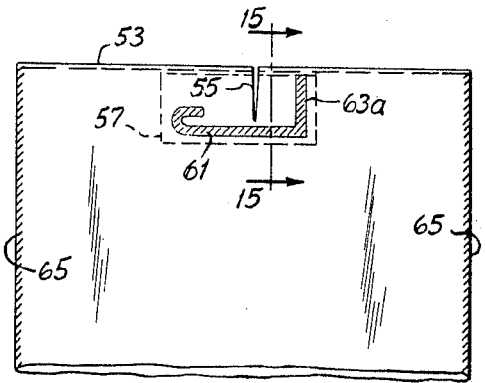
FIG. 14 is a fragmentary elevation showing a third species of valve bag made in accordance with this invention constituting a variant of the FIG. 12 species.

FIGS. 14 and 15 illustrate a variant of the FIG. 12 bag substantially identical to the latter except that the strap 57 is on the inside instead of on the outside of the bag. This is made in the same manner as the FIG. 12 bag, except that the assembly of the blank 51 and strap 57 shown in FIG. 11 is folded so that strap 57 ends upon the inside instead of on the outside. With this internally disposed strap construction, the filling spout is inserted through the slit from the right of the slit as viewed in FIG. 14, and between the fold 53 and the top portion of the strap to the left of the slit as viewed in FIG. 14, which top portion of the strap is free to separate from the top of the bag.

FIGS. 16 and 17 illustrate a variant of the bag shown in FIGS. 7-9, differing therefrom in that the strap is on the inside instead of on the outside of the bag. The strap in FIGS. 16 and 17 is designated 69 to distinguish it from strap 29. As shown in FIG. 17, the strap 69 has a coating of heat-seal-inhibiting material at 71 on half of one face thereof, i.e., the face on the inside in the folded condition of the strap. This prevents heat-sealing together of the two sides of the strap 69 when the L-shaped heat seals 35 (the same as in FIGS. 7 and 8) are formed. The bag also has a stripe 13 of heat-seal-inhibiting material (the same as in FIGS. 1-4 and 7-9) which inhibits sealing together of the bag walls when tape 19 is heat-sealed in place and which inhibits heat-sealing of the sides of the strap 69 to the bag walls along the lines of heat seals 21. In manufacturing the bag shown in FIGS. 16 and 17, a slit is cut at 27 in the bag walls first, then the strap 69 is inserted and heat-sealed in place. Then tape 19 is applied, and slit to complete the formation of the slit 27. It is contemplated that tape 19 could be applied first, slit 27 made in the tape and bag walls, and strap 69 then inserted from the other end of the bag before the latter end is closed, and heat-sealed in place.

FIGS. 18 and 19 illustrate another modification corresponding generally to the bag shown in FIG. 12 except that the top of the bag is closed by a heat seal 71 directly securing the walls of the bag together along a line extending across the bag, instead of by an integral fold as at 53 in FIG. 12. No heat-seal-inhibiting coating material is shown in FIGS. 18 or 19, to illustrate that this could be made by inserting a separator sheet or plate to serve as a heat-seal-inhibitor from the open bottom of the bag between the walls of the bag to keep the bag walls from being heat-sealed together when the L-shaped heat seals 35 are formed. However, a heat-seal-inhibiting coating could be used for this purpose on the inside of one or both bag walls. It will be understood that the seal at 71 is completed and the bag slit at 55 before the strap 29 is applied.

In view of the above, it will be seen that the several objects of the invention are achieved and other advantageous results attained.

As various changes could be made in the above methods without departing from the scope of the invention, it is intended that all matter contained in the above description or shown in the accompanying drawings shall be interpreted as illustrative and not in a limiting sense.

What is claimed is:

1. The method of making a valve bag from a tube of heat-sealable sheet plastic material, said tube having opposed walls, comprising closing one end of said tube, cutting a slit through said closed end of said tube and in both walls of said tube extending inward from said closed end, applying a closure for said slit, said closure comprising a piece of heat-sealable sheet plastic material folded on a line to have two sides, and being applied with its said line of fold at said one end of the tube and its sides lying against the walls of the tube, and heat-sealing each side of the closure to the respective wall of the tube along a line extending generally parallel to said end of the tube and spaced inward from the inner end of the slit without heat-sealing the two sides of the closure or the bag walls together along said line of heat-seal.

2. The method of claim 1 wherein the closure is folded around said end of the tube on the outsilde of the tube.

3. The method of claim 1 wherein the closure is inserted between the walls of the tube.

4. The method of making a valve bag of heat-sealable sheet plastic material comprising forming a bag of said material closed all around its edges, said bag having opposed walls, and being provided with heat-seal-inhibiting material on the inside of at least one of said walls adjacent one edge of the bag, cutting a slit in both walls of the bag extending inward from said one edge of the bag in the region of said heat-seal-inhibiting materail, folding a piece of heat-sealable sheet plastic material around said one edge of the bag to overlie the slit, and heat-sealing opposite sides of said piece of material to the opposite walls of the bag inward of the inner end of the slit without heat-sealing together said walls by applying heat and pressure within the confines of said heat-seal-inhibiting material.

5. The method of claim 4 wherein said heat-sealing is along a line having a portion extending transversely with respect to the slit and a portion extending along one side of the slit.

6. The method of making a valve bag of heat-sealable sheet plastic material comprising forming a tube of said material with stripes of heat-seal-inhibiting material across the inside of the walls thereof at each end thereof, and with an additional area of heat-seal-inhibiting material on the inside of at least one wall adjacent one end of the tube, folding a tape of heat-sealable sheet plastic material around each end of the tube and applying heat and pressure to the opposite sides of each tape to heat seal it to the outsides of the tube walls along a line extending transversely across the tube adjacent the respective end of the tube and within the confines of the respective stripe, cutting a slit in the tape at said one end of the tube and in both walls of the tube extending inward from said one end of the bag in the region of said additional area of heat-seal-inhibiting material, folding a piece of heat-sealable sheet plastic material around the tape at said one end of the tube to overlie the slit, and heat-sealing opposite sides of said piece of material to the walls of the bag inward of the inner end of the slit without heat-sealing together said walls by applying heat and pressure within the confines of said area of heat-seal-inhibiting material.

7. The method of claim 6 wherein said heat-sealing is along a line having a portion extending transversely with respect to the slit and a portion extending along one side of the slit.

8. The method of making a valve bag utilizing a generally rectangular blank of heat-sealable sheet material ultimately to be folded in half on a fold line extending across the blank, comprising cutting a slit in the blank extending across the location of said fold line, applying a closure of heat-sealable sheet plastic material to the blank over the slit, heat-sealing the closure to the blank on lines extending generally parallel to the location of said fold line and lying outward of the ends of the slit, folding the blank and the closure on said fold line, and seaming the folded blank at its three margins other than said fold line to form it into a bag, with the closure extending around said fold line at the respective margin of the bag and overlying the slit, a portion of said closure between said lines of seal being free of said margin of the bag and the slit being open so that a filling spout may be inserted from one end of said closure between the closure and said margin and through the slit for filling the bag.

9. The method of claim 8 wherein the blank is folded with the closure on the outside.

10. The method of claim 8 wherein the blank is folded with the closure on the inside.

References Cited

UNITED STATES PATENTS

| | | | |
|---|---|---|---|
| 2,294,220 | 8/1942 | Albertson | 93—35 |
| 2,562,423 | 7/1951 | Hood | 93—56 |
| 2,753,768 | 7/1956 | Hahn | 93—8 |
| 3,193,180 | 7/1965 | Lissner. | |
| 3,214,312 | 10/1965 | Gattrugeri. | |
| 3,215,048 | 11/1965 | Gattrugeri. | |
| 3,279,330 | 10/1966 | Harding | 93—8 |

FOREIGN PATENTS

Re. 63,967  10/1955  France.

WAYNE A. MORSE, JR., *Primary Examiner.*

U.S. Cl. X.R.

93—8, 56